United States Patent
Barton et al.

(10) Patent No.: US 11,558,779 B2
(45) Date of Patent: *Jan. 17, 2023

(54) SECURE CREATION OF APPLICATION CONTAINERS FOR FIFTH GENERATION CELLULAR NETWORK SLICES

(71) Applicant: Cisco Technology, Inc., San Jose, CA (US)

(72) Inventors: Robert Edgar Barton, Richmond (CA); Russell Paul Gyurek, Raleigh, NC (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,263

(22) Filed: Mar. 1, 2022

(65) Prior Publication Data
US 2022/0191736 A1    Jun. 16, 2022

Related U.S. Application Data

(63) Continuation of application No. 16/841,526, filed on Apr. 6, 2020, now Pat. No. 11,284,297.

(51) Int. Cl.
*H04L 12/723* (2013.01)
*H04W 28/06* (2009.01)
(Continued)

(52) U.S. Cl.
CPC .......... *H04W 28/06* (2013.01); *H04L 45/50* (2013.01); *H04W 40/02* (2013.01)

(58) Field of Classification Search
CPC ...... H04W 28/06; H04W 40/02; H04L 45/50; H04L 41/0894; H04L 41/0895;
(Continued)

(56) References Cited

U.S. PATENT DOCUMENTS 8,566,474 B2   10/2013  Kanode et al.
2018/0077023 A1*  3/2018  Zhang ................ H04L 41/0806
(Continued)

FOREIGN PATENT DOCUMENTS

WO   2018089417 A1   5/2018
WO   2019242856 A1   12/2019
(Continued)

OTHER PUBLICATIONS

International Search Report and Written Opinion from the International Searching Authority, dated Jun. 29, 2021, 12 pages, for corresponding International Patent Application No. PCT/US2021/024839.

(Continued)

*Primary Examiner* — Wutchung Chu
(74) *Attorney, Agent, or Firm* — Polsinelli

(57) ABSTRACT

Systems, methods, and computer-readable media for the secure creation of application containers for 5G slices. A MEC application in a MEC layer of a 5G network can be associated with a specific network slice of the 5G network. A backhaul routing policy for the MEC application can be defined based on the association of the MEC application with the specific network slice of the 5G network. Further, a SID for the MEC application that associates the MEC application with a segment routing tunnel through a backhaul of the 5G network can be generated. A MEC layer access policy for the MEC application can be defined based on the SID for the MEC application. As follows, access to the MEC application through the 5G network can be controlled based on both the backhaul routing policy for the MEC application and the MEC layer access policy for the application.

20 Claims, 10 Drawing Sheets

(51) Int. Cl.
*H04L 45/50* (2022.01)
*H04W 40/02* (2009.01)

(58) Field of Classification Search
CPC . H04L 41/0896; H04L 41/40; H04L 41/5045; H04L 45/34
See application file for complete search history.

(56) References Cited

U.S. PATENT DOCUMENTS

| | | |
|---|---|---|
| 2018/0159765 A1 | 6/2018 | Shi et al. |
| 2018/0376338 A1* | 12/2018 | Ashrafi ............... H04L 67/10 |
| 2019/0104030 A1* | 4/2019 | Giust ............... H04L 41/0816 |
| 2019/0319868 A1* | 10/2019 | Svennebring ........ H04L 41/147 |
| 2019/0380028 A1 | 12/2019 | Rasanen |
| 2020/0008044 A1* | 1/2020 | Poornachandran ... H04W 24/08 |
| 2020/0008067 A1 | 1/2020 | Filsfils et al. |
| 2020/0053546 A1 | 2/2020 | Panchai et al. |
| 2020/0125389 A1* | 4/2020 | Palermo ............... G06F 9/5027 |
| 2020/0136978 A1* | 4/2020 | Li ........................ H04L 67/141 |
| 2020/0154459 A1* | 5/2020 | Mukherjee ............. H04L 65/80 |
| 2020/0169856 A1* | 5/2020 | Yang ...................... H04L 67/63 |
| 2020/0169880 A1* | 5/2020 | Wen ...................... H04L 63/102 |
| 2020/0195495 A1* | 6/2020 | Parker ................... H04L 41/082 |
| 2020/0204942 A1* | 6/2020 | Young ................... H05K 999/99 |
| 2020/0275313 A1* | 8/2020 | He ....................... H04W 28/0983 |
| 2020/0302431 A1* | 9/2020 | Polehn .................. H04L 63/102 |
| 2020/0374974 A1* | 11/2020 | Sun ....................... H04L 41/20 |
| 2020/0389531 A1* | 12/2020 | Lee ........................ H04L 67/56 |
| 2021/0028992 A1* | 1/2021 | Chang ................... H04L 67/10 |
| 2021/0051104 A1* | 2/2021 | He ........................ G06N 20/00 |
| 2021/0084525 A1* | 3/2021 | Takano .................. H04W 4/06 |
| 2021/0126840 A1* | 4/2021 | Venkataramu ....... H04L 41/5019 |
| 2021/0144057 A1* | 5/2021 | Giust .................... H04L 63/0869 |
| 2021/0144517 A1* | 5/2021 | Guim Bernat ....... H04W 12/04 |
| 2021/0194821 A1* | 6/2021 | Guim Bernat ....... G06F 9/5077 |
| 2021/0360714 A1* | 11/2021 | Zhang .................. H04L 41/5051 |

FOREIGN PATENT DOCUMENTS

| | | | |
|---|---|---|---|
| WO | 2020185794 A1 | 9/2020 | |
| WO | WO-2020185794 A1 * | 9/2020 | ......... H04L 41/0853 |

OTHER PUBLICATIONS

Hang et al., "5G Programmable Infrastructure Converging Disaggregated Network and 3OMPUTE Resources," https://www.5g-picture-project.eu/, Apr. 4, 2018, pp. 1-105.

* cited by examiner

SECURE CREATION OF APPLICATION CONTAINERS FOR FIFTH GENERATION CELLULAR NETWORK SLICES

CROSS-REFERENCE TO RELATED APPLICATION

This is a continuation of U.S. Non-Provisional patent application Ser. No. 16/841,526, filed Apr. 6, 2020, the content of which is hereby expressly incorporated by reference in its entirety.

TECHNICAL FIELD

The subject matter of this disclosure relates in general to the field of secure creation of application containers for fifth generation (5G) slices, and more particularly, to controlling access to a Mobile Edge Compute (MEC) application through a 5G network based on a backhaul routing policy for the MEC application and a MEC layer access policy.

BACKGROUND

As 5G network technology continues to evolve, new services are offered that bring applications closer to end users, in what is referred to as MEC solutions or otherwise Multi-Access Edge Compute solutions. Specifically, in MEC solutions, applications are run as close as possible to the user, e.g. within the RAN, at a nearby aggregation point, or potentially in an on-premise location related to the applications.

5G network technology provides network slicing in the cellular network domain. Such slicing can provide isolation between network services on a per-slice basis. Further, network slicing can facilitate service level agreement (SLA) implementation and resource reservation on a per-slice basis.

Combing the capabilities of 5G network slicing and MEC can further offer many advantageous in providing network services through 5G networks. However, implementing such technologies together presents many problems. In particular, one of the main challenges of implementing these technologies together is the secure orchestration of MEC application deployment/implementation and slice creation. Specifically, it is difficult to maintain slicing isolation between MEC applications when the access to the associated applications occurs from different points of the 5G architecture.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1A:
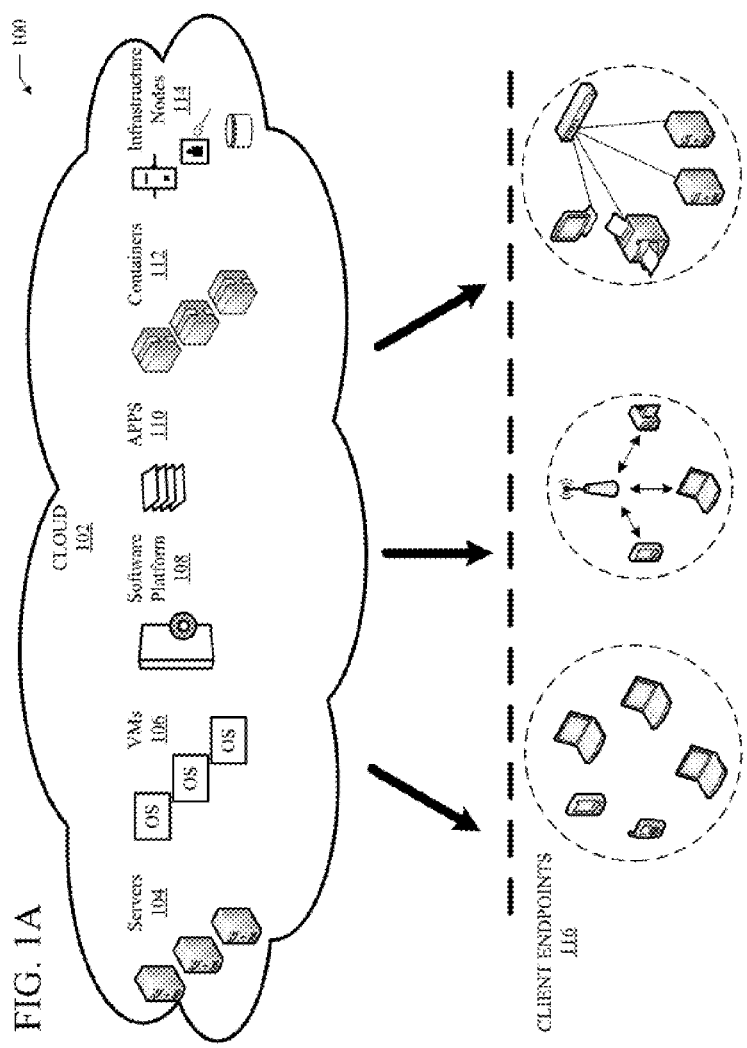
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method for the secure creation of application containers for 5G slices include the following operations. A MEC application in a Mobile Edge Compute (MEC) layer of a Fifth Generation (5G) network can be associated with a specific network slice of the 5G network. A backhaul routing policy for the MEC application can be defined based on the association of the MEC application with the specific network slice of the 5G network. Further, a segment identifier (SID) for the MEC application that associates the MEC application with a segment routing tunnel through a backhaul of the 5G network can be generated. A MEC layer access policy for the MEC application can be defined based on the SID for the MEC application. As follows, access to the MEC application through the 5G network can be controlled based on both the backhaul routing policy for the MEC application and the MEC layer access policy for the application.

A system that includes one or more processors, and at least one computer-readable storage medium having stored therein instructions which, when executed by the one or more processors, can cause the one or more processors to perform the following operations for the secure creation of application containers for 5G slices. A MEC application in a Mobile Edge Compute (MEC) layer of a Fifth Generation (5G) network can be associated with a specific network slice of the 5G network. A backhaul routing policy for the MEC application can be defined based on the association of the MEC application with the specific network slice of the 5G network. Further, a segment identifier (SID) for the MEC application that associates the MEC application with a segment routing tunnel through a backhaul of the 5G network can be generated. A MEC layer access policy for the MEC application can be defined based on the SID for the MEC application. As follows, access to the MEC application through the 5G network can be controlled based on both the backhaul routing policy for the MEC application and the MEC layer access policy for the application.

A non-transitory computer-readable storage medium having stored therein instructions which, when executed by one or more processors, can cause the one or more processors to perform the following operations for the secure creation of application containers for 5G slices. A MEC application in a Mobile Edge Compute (MEC) layer of a Fifth Generation (5G) network can be associated with a specific network slice of the 5G network. A backhaul routing policy for the MEC application can be defined based on the association of the MEC application with the specific network slice of the 5G network. Further, a segment identifier (SID) for the MEC application that associates the MEC application with a segment routing tunnel through a backhaul of the 5G network can be generated. A MEC layer access policy for the MEC application can be defined based on the SID for the MEC application. As follows, access to the MEC application through the 5G network can be controlled based on both the backhaul routing policy for the MEC application and the MEC layer access policy for the application.

EXAMPLE EMBODIMENTS

The disclosed technology addresses the need in the art for securely orchestrating MEC application deployment and 5G slice creation, e.g. combing the capabilities of 5G network slicing and MEC technology. In particular, the disclosed technology addresses the need in the art for securely maintaining slice isolation for MEC applications when the access to the MEC applications occurs from different points of the 5G architecture. The present technology involves system, methods, and computer-readable media for securely creating application containers for 5G slices. In particular, the present technology involves systems, methods, and computer-readable media for securely controlling access to a MEC application through the 5G backhaul network. Further, the present technology involves systems, methods, and computer-readable media for securely controlling access to a MEC application through the 5G backhaul network based on a backhaul routing policy and a MEC layer access policy.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
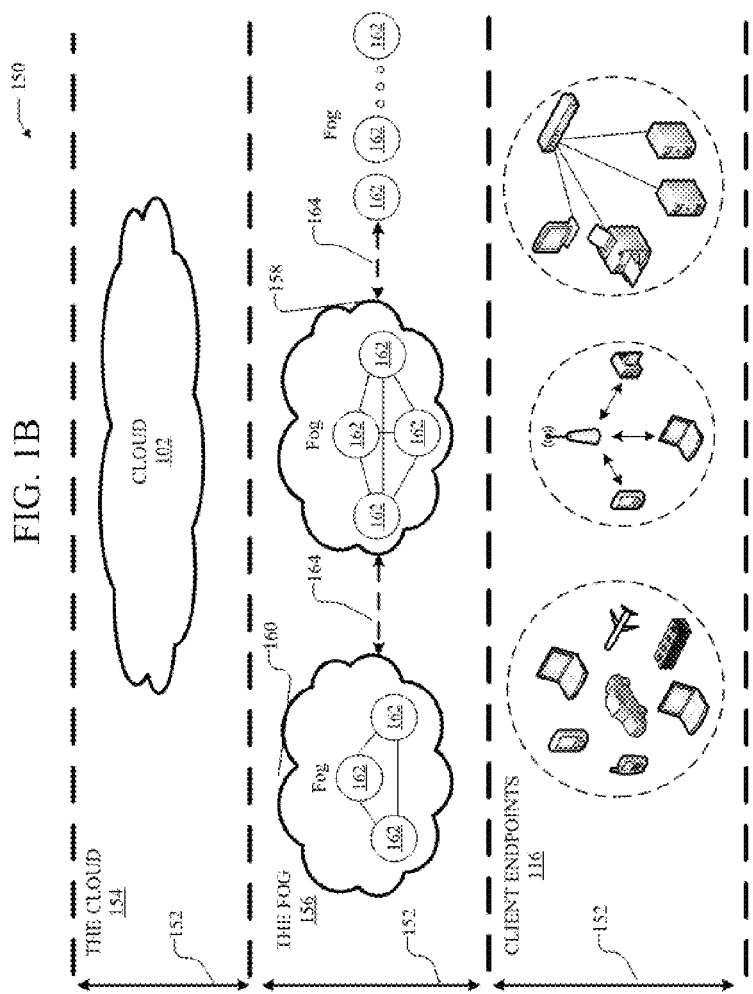
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
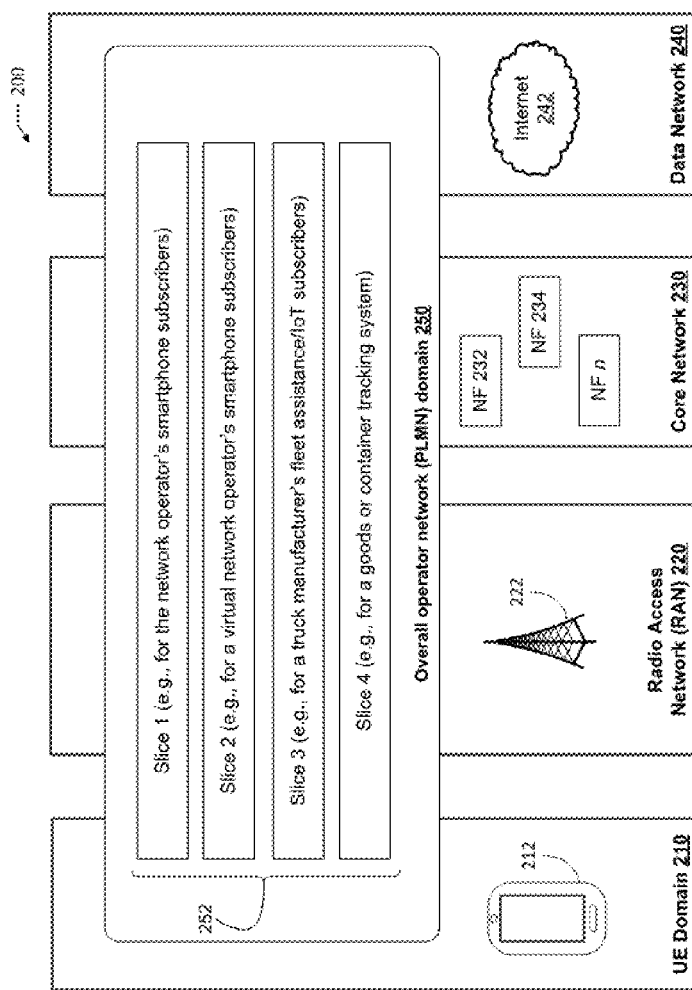
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

As discussed previously, there is a need in the art for securely orchestrating MEC application deployment and 5G slice creation together, when combing the capabilities of 5G network slicing and MEC technology. In particular, there are difficulties with securely maintaining slice isolation when the access to the associated applications occurs from different points of the 5G architecture. There are also issues with securely controlling access to a MEC application through the 5G backhaul network.

The present technology includes systems, methods, and computer-readable media for solving these problems/discrepancies.

Figure 3A:
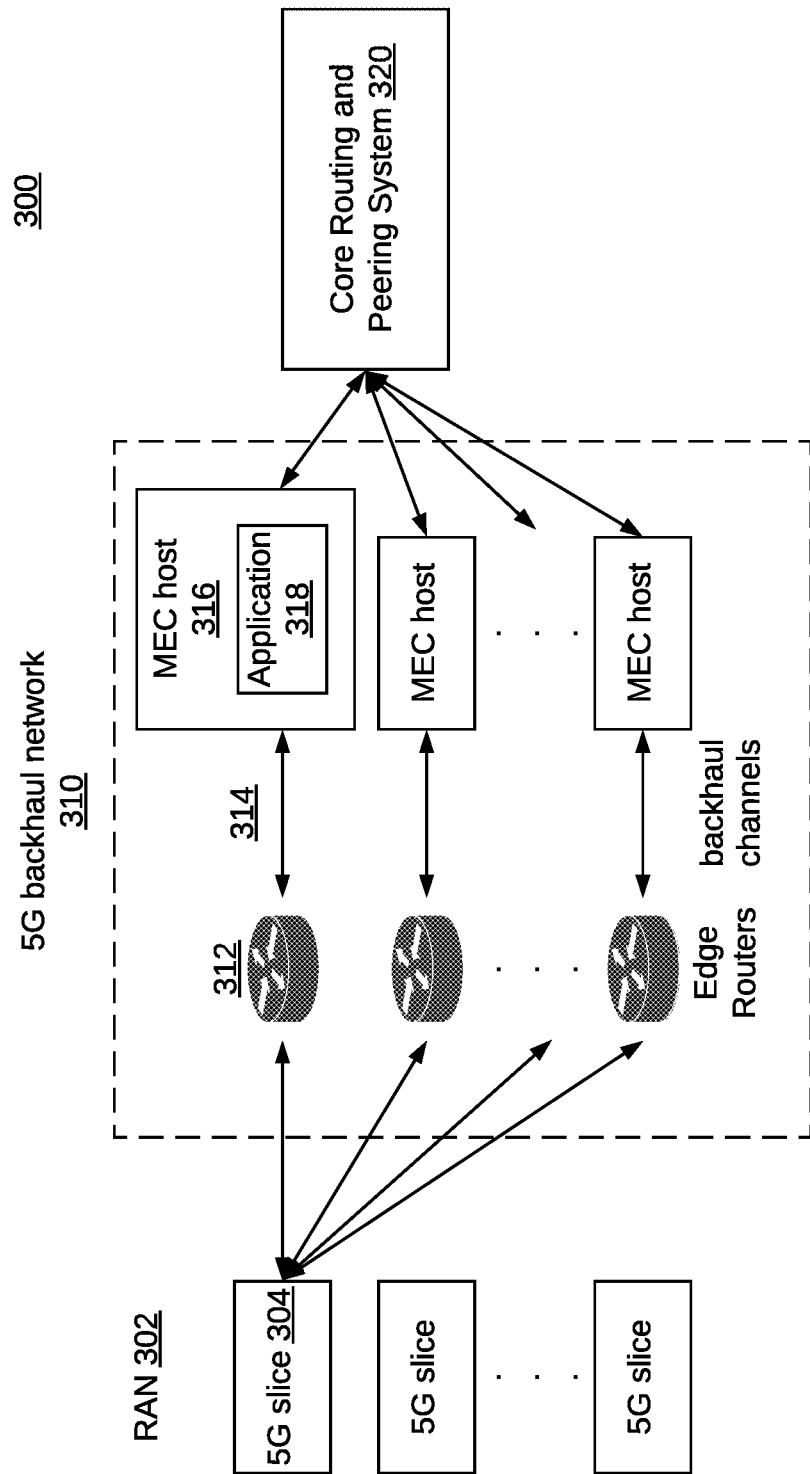
FIG. 3A illustrates an example of a 5G network architecture 300 in accordance with various embodiments.

FIG. 3A illustrates an example of a 5G network architecture 300 in accordance with various embodiments. However, one of ordinary skill in the art will understand that, for the network architecture 300 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. Specifically, the network architecture 300 can be implemented, at least in part, through an applicable network environment, such as the network architectures 100, 150, and 200 shown in FIGS. 1A, 1B, and 2.

Network architecture 300 includes RAN 302, 5G backhaul network 310, and core routing and peering system 320. Although shown as independent network components, the core routing and peering system 320 can also be included as part of the 5G backhaul network 310. The core routing and peering system 320 will be described in more detail with regard to FIG. 3B.

The RAN 302 resides between and provides connections between network devices and the 5G backhaul network 312. RAN 302 further includes endpoints and 5G slices, such as 5G slice 304. The 5G slices are created and tailored to the users' requirements, such as running a specific application within the user's slice. The network devices can communicate with the rest of the 5G network through the RAN 302.

5G backhaul network 310 includes edge routers, such as the edge router 312, and MEC hosts, such as the MEC host 316. The MEC hosts can support applications for providing network services to network devices through the RAN 302. A user can order applications to be installed in the MEC hosts, such as the MEC application 318 in the MEC host 316. Edge routers can receive incoming packets from 5G slices within the RAN 302, and further route the packets through the 5G backhaul network 310 via backhaul channels, such as backhaul channel 314. The backhaul channels can include one or more router nodes to forward the packets through the 5G backhaul network 310.

The backhaul channels can form part of one or more tunnels for transmitting packets from the edge routers to MEC applications through segment routing. The segment routing tunnels formed by backhaul channels in the 5G backhaul network 310 can be specific to one or more MEC applications. For example, the backhaul channel 314 can support a segment routing tunnel that is specific to the MEC application 318. In turn, the edge router 312 can forward traffic destined to the MEC application 318 through the segment routing tunnel that is specific to the MEC application 318 and supported by the backhaul channel 314.

In the 5G backhaul network 310, each router and each link can be associated with a Segment Identifier (SID), a potentially unique SID. In turn, the SIDs associated with the routers and links can be used in forwarding packets through the 5G backhaul network 310, e.g. through segment routing tunnels. Specifically, segment routing tunnels can be defined using SIDs and packets can be forwarded through applicable segment routing tunnels using the SIDs. More specifically, a segment routing stack including SIDs can be used to route traffic through specific segment routing tunnels. As follows, traffic from specific 5G slices can be routed through specific segment routing tunnels using the SIDs associated with the specific segment routing tunnels, effectively segmenting the 5G slices from each other in the 5G backhaul network 310. From top to bottom, each SID of the segment routing stack identifies a temporary destination for the packets through the 5G backhaul network 310, with the order of the SIDs indicating the route for the packets and the last SID identifying the final destination. Once the packets reach a destination, the SID identifying such destination would be deleted from the top of the segment routing stack, and the packets will be forwarded to the next destination identified by the next SID of the segment routing stack.

Each of the 5G slices in the RAN 302 can be associated with a SID. Specifically, each of the 5G slices in the RAN 302 can be uniquely associated with a SID. In turn, the SIDs of the 5G slices can be used in segmenting the 5G slices from each other. For example, traffic received at the edge router 312 from the 5G slice 304 can include a SID uniquely associated with the 5G slice 304. In turn, this SID can identify that the traffic arrived from the 5G slice 304 and not the other 5G slices in the RAN 302, effectively segmenting the 5G slices from each other in the RAN 302.

Figure 3B:
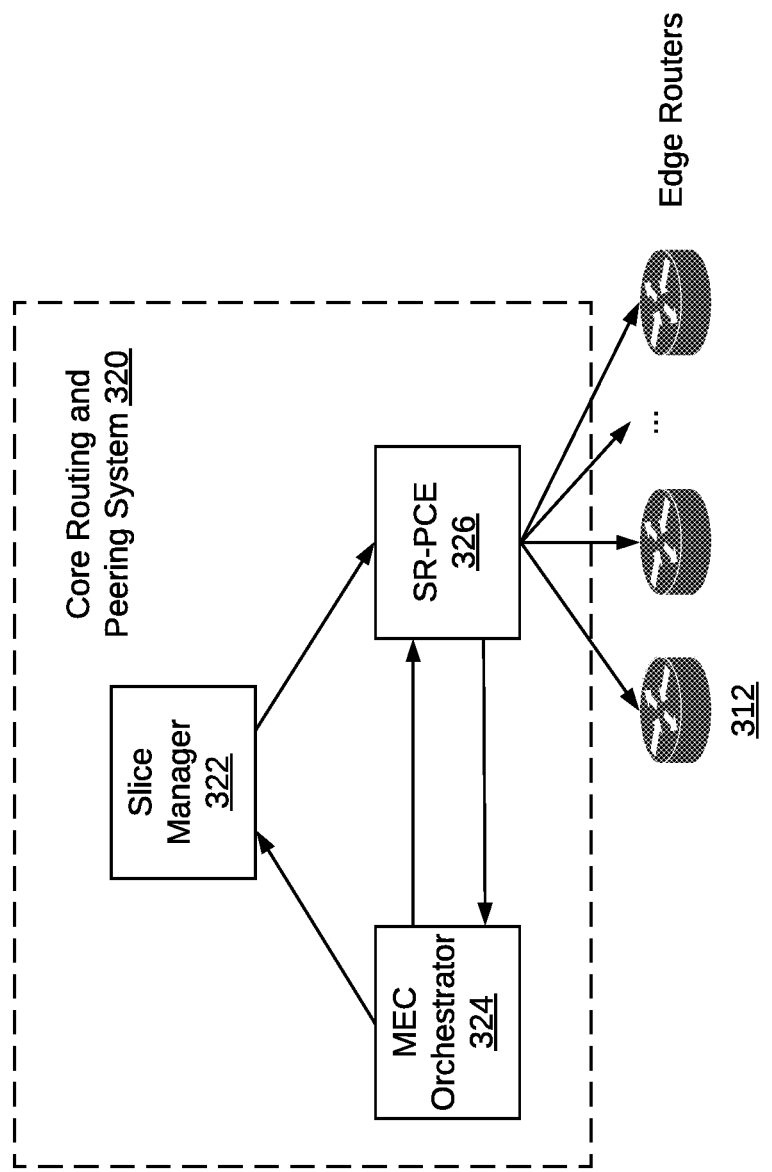
FIG. 3B illustrates an example of a core routing and peering system 320 in accordance with various embodiments.

FIG. 3B illustrates an example of a core routing and peering system 320 in accordance with various embodiments. As shown in FIG. 3B, core routing and peering system 320 further includes slice manager 322, MEC Orchestrator 324, and Segment Routing Path Computation Element (SR-PCE) 326. Slice manager 322 orchestrates the network slices of the 5G network. MEC Orchestrator 324 orchestrates the MEC applications related to the 5G network. SR-PCE 326 computes paths through the 5G backhaul network 310 for incoming packets using the SIDs in the segment routing stack. SR-PCE 326 can also communicate with the edge routers. The above elements of the core routing and peering system 320 can coordinate with each other to associate a 5G slice with an application and securely deploy/maintain the application through the 5G backhaul network 310 in accordance with various embodiments. Details of such coordination will be described with regard to FIG. 4 and FIG. 5.

Figure 4:
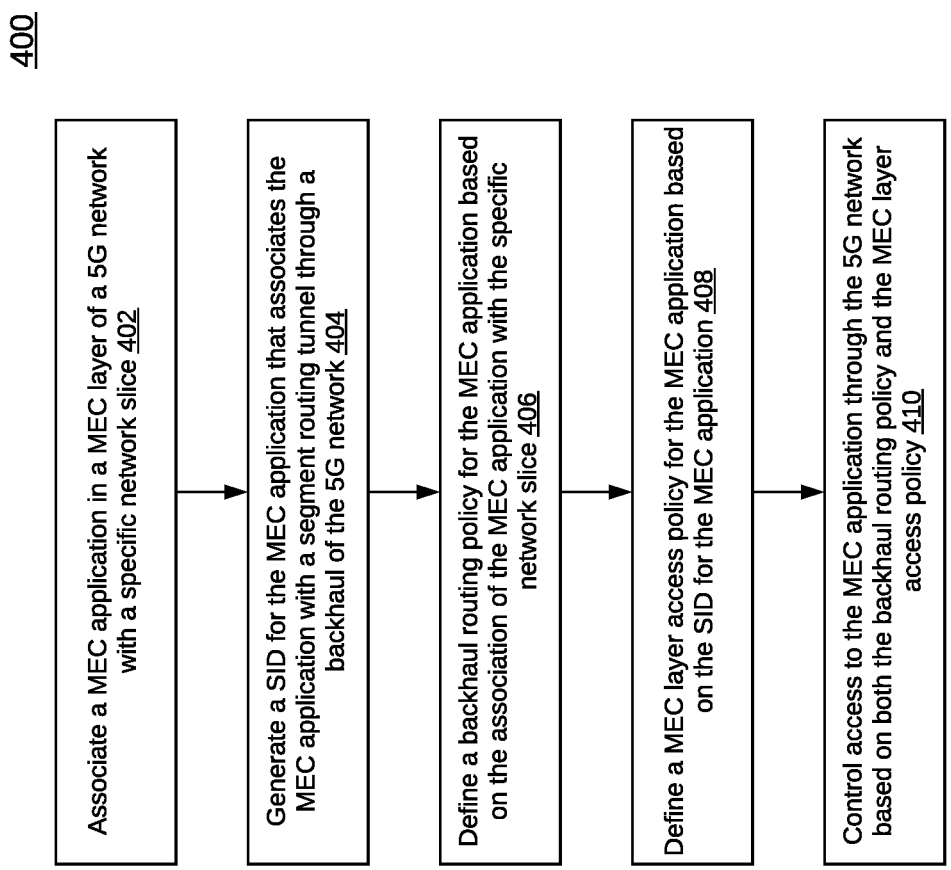
FIG. 4 illustrates an example method for securely controlling access to a MEC application through the 5G backhaul network in accordance with various embodiments.

FIG. 4 illustrates an example method for securely controlling access to a MEC application through the 5G backhaul network in accordance with various embodiments. The method shown in FIG. 4 will be described with regard to FIGS. 3A and 3B. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Once a user orders a MEC application to be installed in a MEC host, the MEC Orchestrator associates the MEC application in a MEC layer of a 5G network with a specific 5G network slice (402). For example, after the user orders the MEC application 318 to be installed in the MEC host 316, the MEC Orchestrator 324 associates the MEC application 318 in a MEC layer of a 5G network 300 with the specific 5G network slice 304. In some embodiments, a new 5G slice can be created to be associated with the MEC application. In some embodiments, the user can order multiple MEC applications within a Pod to be installed, and the MEC Orchestrator can associate the Pod with a specific network slice.

SR-PCE generates a new global prefix SID for the MEC application that associates the MEC application with a segment routing tunnel through a backhaul of the 5G network (404). For example, SR-PCE 326 generates a new global prefix SID for the MEC application 318 that associates the MEC application 318 with the segment routing tunnel 314 through the 5G backhaul network 310. The new global prefix SID can be globally unique. In some embodiments, such a new global prefix SID can be generated for a Pod of multiple applications, or for all MEC applications within the same network slice. SR-PCE informs the MEC Orchestrator about the new global prefix SID.

The MEC orchestrator defines a backhaul routing policy for the MEC application based on the association of the MEC application with the specific network slice of the 5G network (406). In some embodiments, the backhaul routing policy can indicate that a specific slice, a specific cloud service, or the 5G core network can communicate with the MEC application. In particular, the backhaul routing policy can indicate what specific cloud service(s) and/or portions of the 5G core network can communicate with the MEC application through one or more network slices in a RAN of the 5G network. The backhaul routing policy will be described in more details with regard to FIG. 5.

In some embodiments, process 404 is performed to implement such backhaul routing policy defined in process 406. For example, MEC Orchestrator 324 informs the slice manager 322 that the MEC application 318 in a MEC layer of a 5G network 300 is associated with the specific 5G network slice 304. The MEC Orchestrator can also inform the slice manager 322 about the backhaul routing policy and location of the MEC host 316 where the MEC application 318 resides. Either the slice manager 322 or the MEC Orchestrator 324 can communicate the above information to SR-PCE 326, and the SR-PCE 326 can implement the backhaul routing policy defined in process 406 by generating a prefix SID as detailed in process 404.

The MEC orchestrator also defines a MEC layer access policy for the MEC application based on the prefix SID for the MEC application (408). In some embodiments, the MEC layer access policy can specify which packets can access the MEC application. Moreover, packets that are not authorized can be dropped before they can access the MEC application. The MEC layer access policy will be described in more details with regard to FIG. 6.

The core routing and peering system along with the 5G backhaul network control access to the MEC application through the 5G network based on both the backhaul routing policy and the MEC layer access policy (410). Both policies will be described in more details with regard to FIG. 5 and FIG. 6.

Figure 5:
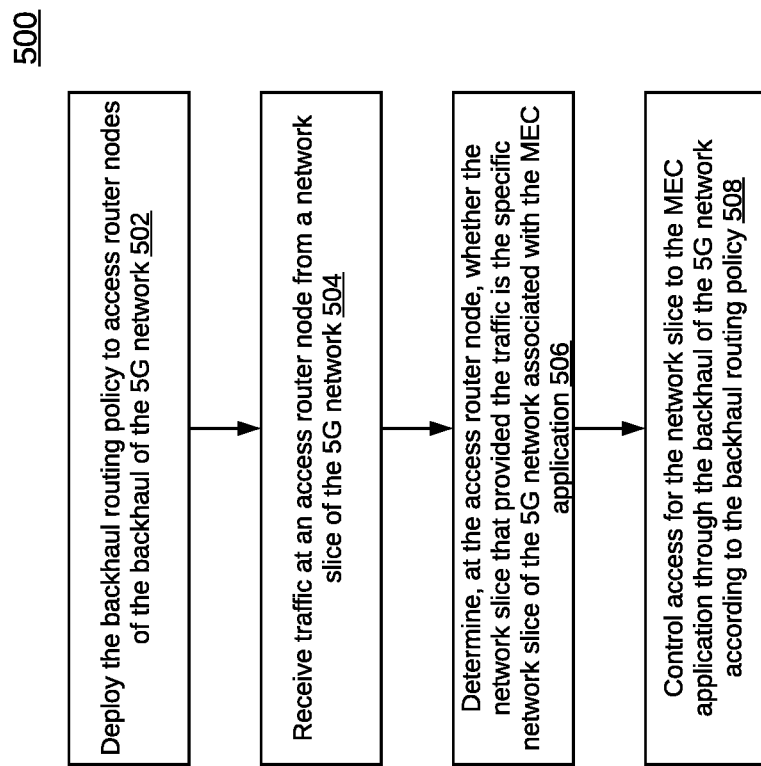
FIG. 5 illustrates an example method for securely controlling access to a MEC application through the 5G backhaul network based on the backhaul routing policy in accordance with various embodiments.

FIG. 5 illustrates an example method for securely controlling access to a MEC application through the 5G backhaul network based on the backhaul routing policy in accordance with various embodiments. The method shown in FIG. 5 will be described with regard to FIGS. 3A and 3B. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

The backhaul routing policy can specify adding the new global prefix SID for the MEC application in the segment routing stack of traffic received from the network slice at the one or more access router nodes/edge nodes if the network slice matches the specific network slice of the 5G network associated with the MEC application. The backhaul routing policy can also specify forwarding the traffic after the new global prefix SID of the MEC application is added to the traffic to the MEC layer of the 5G network over the segment routing tunnel through the backhaul of the 5G network associated with the MEC application. In some embodiments, SR-PCE can add such new global prefix SID for the MEC application to the bottom of the segment routing stack of packets from a network slice if this network slice matches the specific network slice as defined in the backhaul routing policy. The packets can then be forwarded to the MEC application through the 5G backhaul network utilizing the new global prefix SID of the MEC application. With the prefix SID of the MEC application being the last SID at the bottom of the segment routing stacks of the packets, the MEC application will be designated as the final destination of such packets.

To enforce the backhaul routing policy, SR-PCE first deploys the backhaul routing policy to access router nodes of the backhaul of the 5G network (502). For example, SR-PCE 326 deploys the backhaul routing policy to edge routers including edge router 312 of the 5G backhaul network 310. In some embodiments, the SR-PCE implements the backhaul routing policy by distributing the prefix SID of the MEC application to the access router nodes of the backhaul of the 5G network, thus the packets can be routed to the MEC application according to the backhaul routing policy using the prefix SID of the MEC application.

At least one access router node receives packets in the incoming traffic from a network slice of the 5G network (504). For example, edge router 312 can receive packets in the incoming traffic from a 5G network slice 304 through the RAN 302 of the 5G network 300.

The access router node determines whether the network slice that provided the traffic is the specific network slice of the 5G network associated with the MEC application (506). For example, the edge router 312 determines whether the network slice that provided the traffic is the specific 5G network slice 304 of the 5G network associated with the MEC application 318. Specifically, each of the packets of the incoming traffic can include a network slice SID associated with the network slice from which the traffic is received. Accordingly, such network slice ID can be utilized in determining the origin of the traffic, e.g. the network slice that forwarded the traffic to the 5G network backhaul. In some embodiments, process 506 can further include determining whether the network slice that provided the packets of the incoming traffic is the specific network slice of the 5G network associated with the MEC application. This determination can be based on whether the network slice SID received in the packets of the incoming traffic from the network slice matches a specific network slice SID associated with the specific network slice of the 5G network, e.g. as indicated by the backhaul routing policy.

In some embodiments, because the backhaul routing policy can also indicate that packets from a specific cloud service, or the 5G core network can communicate with the MEC application, the access router node can also determine whether the specific cloud service or the 5G core network that provided the traffic is the valid source as defined by the backhaul routing policy, e.g. based on the network slice over which the traffic is received.

SR-PCE with the access router nodes control access for the network slice to the MEC application through the backhaul of the 5G network according to the backhaul routing policy based on whether the network slice is the specific network slice of the 5G network associated with the MEC application (508). As the prefix SID of the MEC application forms a segmentation control that links the MEC application to the specific network slice of the 5G network, the access to the MEC application can be controlled utilizing such prefix SID. Specifically, the SID associated with the MEC application can be added to the traffic and the traffic can be forwarded to the application through a tunnel associated with the application. More specifically, the SID associated with the MEC application can be added to the traffic if the traffic is received from the specific network slice associated with the application.

In some embodiments, the SID of the MEC application can be added to the packets received at the access router node through either a multiprotocol label switching (MPLS) tag or an Internet Protocol version 6 (IPv6) Extension Header.

Figure 6:
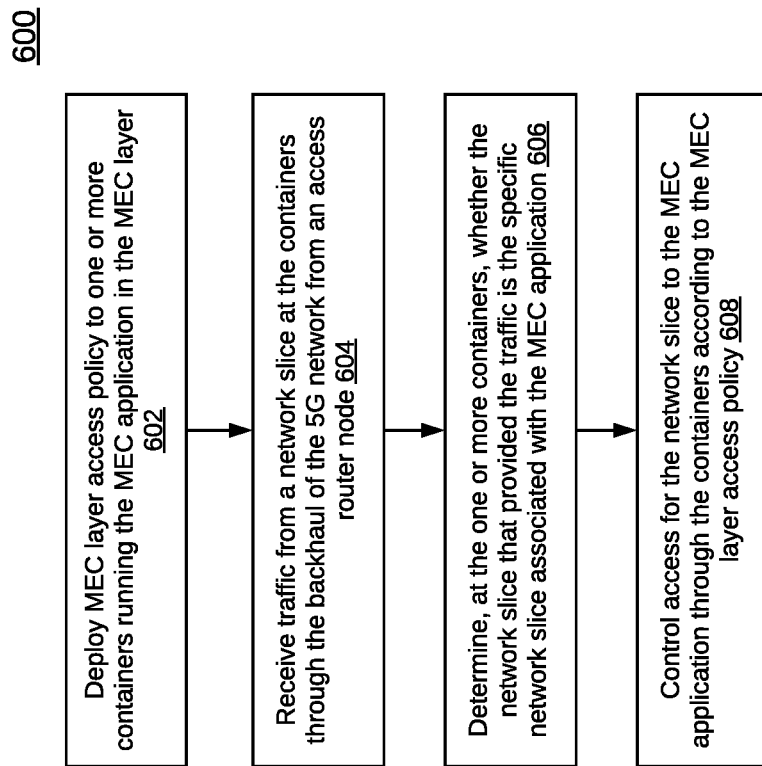
FIG. 6 illustrates an example method for securely controlling access to a MEC application at the MEC layer of the 5G network based on the MEC layer access policy in accordance with various embodiments.

FIG. 6 illustrates an example method for securely controlling access to a MEC application at the MEC layer of the 5G network based on the MEC layer access policy in accordance with various embodiments. The method shown in FIG. 6 will be described with regard to FIGS. 3A and 3B. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

The MEC layer access policy can specify that packets with the MEC application's prefix SID included at the bottom of their segment routing stack can access the MEC application. Moreover, the MEC layer access policy can also specify packets without the MEC application's prefix SID included at the bottom of their segment routing stack will be dropped before they can access the application. The MEC layer access policy can be enforced at different points of the 5G backhaul network, such as at a sidecar of the container running the MEC application, or at the container level. The packets can access the MEC application after the enforcement of MEC layer access policy. The MEC layer access policy can also specify that packets from a specific cloud service, or the 5G core network with the proper prefix SID included at the bottom of their segment routing stack can access the MEC application.

To enforce the MEC layer access policy, the MEC Orchestrator first deploys the MEC layer access policy to one or more containers running the MEC application in the MEC layer (602). For example, the MEC Orchestrator 324 deploys the MEC layer access policy to one or more containers running the MEC application 318 in the MEC layer. In some embodiments, the MEC Orchestrator deploys the MEC application and implements the MEC layer access policy. In some embodiments, the MEC application can be deployed via a container orchestration tool, such as Kubernetes, or be deployed as a virtual machine. In some embodiments, the MEC Orchestrator can deploy a Pod of multiple applications. The MEC Orchestrator can implement the MEC layer access policy at a sidecar of the one or more containers running the MEC application in the MEC layer.

The one or more containers receive traffic from a network slice through the backhaul of the 5G network from an access router node of the backhaul of the 5G network (604). For example, the one or more containers for MEC application 318 can receive traffic from a 5G network slice 304 through the 5G backhaul network 310 from an edge router 312. In some embodiments, one or more sidecars of the one or more containers running the MEC application in the MEC layer can intercept the traffic before it is passed to the MEC application running in the one or more containers.

The one or more containers control access for the network slice to the MEC application according to the MEC layer access policy based on whether the network slice is the specific network slice of the 5G network associated with the MEC application (608). In some embodiments, if it is determined that the network slice that provides the traffic is the specific network slice of the 5G network associated with the MEC application, the traffic can be transmitted to the MEC application. Specifically, if the SID for the MEC application is included at the bottom of the segment routing stack of the packets from the network slice, then the packets can be transmitted to the MEC application. In some embodiments, the one or more containers drop the traffic if the network slice that provides the traffic is the specific network slice of the 5G network associated with the MEC application. Specifically, if SID for the MEC application is not included in the segment routing stack of the packets from the network slice, the one or more containers drop the packets before they access the MEC application. In some embodiments, the above controlling processes can also be performed at the sidecar of the containers.

In controlling access to the MEC applications according to the MEC layer access policy, the one or more containers can effectively determine whether the network slice that provided the traffic is the specific network slice of the 5G network associated with the MEC application (606). For example, the one or more containers for MEC application 318 can determine whether the network slice that provided the traffic is the specific network slice 304 of the 5G network associated with the MEC application 318. In some embodiments, the containers can determine whether the traffic received from the network slice includes the SID for the MEC application at the bottom of the segment routing stack of the packets. As explained above, this is because the inclusion of the SID for the MEC application, by the access router node, in the traffic received at the one or more containers from the network slice is indicative that the network slice is the specific network slice of the 5G network associated with the MEC application. As follows, the one or more containers can effectively determine that the traffic is received from the network slice associated with the MEC application if the traffic includes the SID for the MEC application.

As described previously, the SID for the MEC application is added to the traffic received from the network slice at the access router node according to enforcement of the backhaul routing policy at the access router node. Further, the one or more containers control traffic to the MEC application according to the MEC layer access policy based on inclusion of the SID for the MEC application. Thus, there is coordination between the enforcement of the backhaul routing policy at the access router node and the enforcement of the MEC layer access policy at the MEC layer level. There is also coordination between the 5G backhaul network and elements of the core routing and peering system, such as the slice manager 322, the MEC Orchestrator 324, and the SR-PCE 326. The above determining process can also be performed at the sidecar of the containers.

Figure 7:
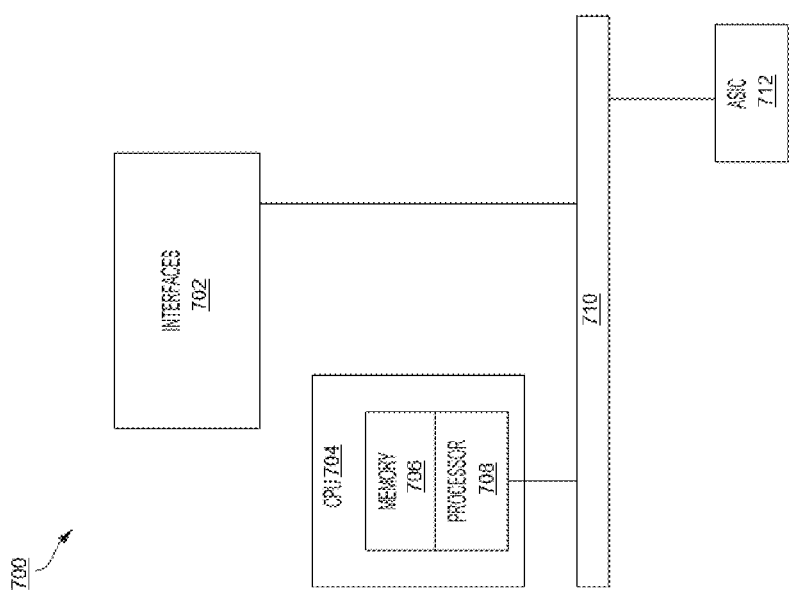
FIG. 7 illustrates an example of a network device.

FIG. 7 illustrates an example of a network device 700 (e.g., switch, router, network appliance, etc.). Such a network device 700 can be the edge routers such as the edge router 312, the edge routers included in backhaul channel 314, the MEC hosts such as MEC host 316, the core routing and peering system 320, the slice manager 322, the MEC Orchestrator 324, and the SR-PCE 326. The network device 700 can include a master central processing unit (CPU) 704, interfaces 702, and a bus 710 (e.g., a PCI bus). When acting under the control of appropriate software or firmware, the CPU 704 can be responsible for executing packet management, error detection, and/or routing functions. The CPU 704 preferably accomplishes all these functions under the control of software including an operating system and any appropriate applications software. The CPU 704 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 706 (such as non-volatile RAM and/or ROM) can also form part of the CPU 704. However, there are many different ways in which memory could be coupled to the system.

The interfaces 702 can be provided as interface cards (sometimes referred to as line cards). The interfaces 702 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 702 may also include an independent processor and, in some instances, volatile RAM. The independent processors may control communication intensive tasks such as packet switching, media control, and management. By providing separate processors for the communication intensive tasks, the interfaces 702 may allow the CPU 704 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 706) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8:
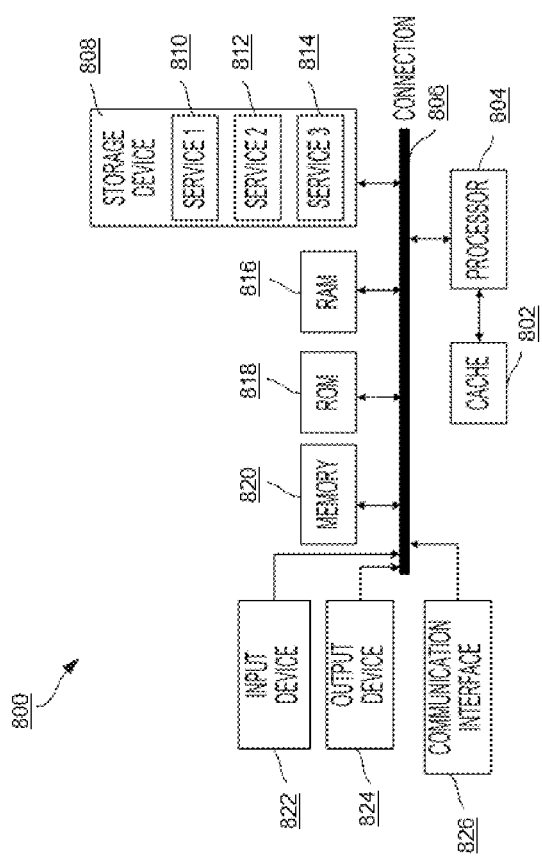
FIG. 8 illustrates an example of a bus computing system wherein the components of the system are in electrical communication with each other using a bus.

FIG. 8 illustrates an example of a bus computing system 800 wherein the components of the system are in electrical communication with each other using a bus 806. The computing system 800 can include a processing unit (CPU or processor) 804 and a system bus 806 that may couple various system components including the system memory 820, such as read only memory (ROM) 818 and random access memory (RAM) 816, to the processor 804. The computing system 800 can include a cache 802 of high-speed memory connected directly with, in close proximity to, or integrated as part of the processor 804. The computing system 800 can copy data from the memory 820, ROM 818, RAM 816, and/or storage device 808 to the cache 802 for quick access by the processor 804. In this way, the cache 802 can provide a performance boost that avoids processor delays while waiting for data. These and other modules can control the processor 804 to perform various actions. Other system memory 820 may be available for use as well. The memory 820 can include multiple different types of memory with different performance characteristics. The processor 804 can include any general purpose processor and a server, a hardware module or software module, such as module 810, module 812, and module 814 stored in the storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with the computing system 800, an input device 822 can represent any number of input mechanisms, such as a microphone for speech, a touch-protected screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system 800. The communications interface 826 can govern and manage the user input and system output. There may be no restriction on operating on any particular hardware arrangement and therefore the basic features here may easily be substituted for improved hardware or firmware arrangements as they are developed.

The storage device 808 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 808 can include the service or software modules 810, 812, 814 for controlling the processor 804. Other hardware or software modules are contemplated. The storage device 808 can be connected to the system bus 806. In some embodiments, a hardware module that performs a particular function can include a software component stored in a computer-readable medium in connection with the necessary hardware components, such as the processor 804, bus 806, output device 824, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
associating a Mobile Edge Compute (MEC) application in a MEC layer of a Fifth Generation (5G) network with a specific network slice of the 5G network;
generating an identifier for the MEC application that associates the MEC application with a segmentation layer through a backhaul of the 5G network;
defining a backhaul routing policy for the MEC application based on the association of the MEC application with the specific network slice of the 5G network, wherein the backhaul routing policy specifies to add the identifier for the MEC application to traffic received from the specific network slice based on the specific network slice being associated with the MEC application;
defining a MEC layer access policy for the MEC application based on the identifier for the MEC application; and
controlling the access to the MEC application through the 5G network, including the segmentation layer, based on both the backhaul routing policy for the MEC application and the MEC layer access policy for the MEC application.

2. The method of claim 1, further comprising:
deploying the MEC layer access policy to a container running the MEC application in the MEC layer;
receiving traffic from a network slice associated with the container through the backhaul of the 5G network;
determining whether the network slice that provided the traffic is the specific network slice of the 5G network associated with the MEC application; and
controlling access for the network slice to the MEC application through the container according to the MEC layer access policy based on whether the network slice is the specific network slice of the 5G network associated with the MEC application.

3. The method of claim 2, wherein the traffic is received through the backhaul of the 5G network from an access router node of the backhaul of the 5G network.

4. The method of claim 2, further comprising:
intercepting the traffic at a sidecar of the container before the traffic is passed to the MEC application running in the container;
determining at the sidecar whether the network slice that provided the traffic is the specific network slice of the 5G network associated with the MEC application; and
selectively dropping the traffic at the sidecar as part of controlling access to the MEC application through the container according to the MEC layer access policy based on whether the network slice is the specific network slice of the 5G network associated with the MEC application.

5. The method of claim 4, further comprising:
providing the identifier for the MEC application to a MEC orchestrator;
deploying, by the MEC orchestrator, the MEC application to the MEC layer; and
implementing, by the MEC orchestrator, the MEC layer access policy at the sidecar of the container running the MEC application in the MEC layer.

6. The method of claim 2, wherein the MEC layer access policy specifies dropping traffic received at containers that fail to include the identifier for the MEC application, the method further comprising:
determining whether the traffic received at the container from the network slice includes the identifier for the MEC application; and
selectively dropping the traffic at the container based on whether the traffic from the network slice includes the identifier for the MEC application.

7. The method of claim 6, wherein an inclusion of the identifier for the MEC application in the traffic received at the container from the network slice is indicative that the network slice is the specific network slice of the 5G network associated with the MEC application.

8. The method of claim 7, wherein:
the traffic is received through the backhaul of the 5G network from an access router node of the backhaul of the 5G network; and
the identifier for the MEC application is added to the traffic at the access router node according to enforcement of the backhaul routing policy at the access router node.

9. The method of claim 1, wherein the MEC application is part of a plurality of MEC applications included in a Pod in the MEC layer and the identifier for the MEC application is also associated with at least a portion of the plurality of MEC applications included in the Pod.

10. A system comprising:
one or more processors; and
a computer-readable medium comprising instructions stored therein, which when executed by the one or more processors, cause the one or more processors to:
associate a Mobile Edge Compute (MEC) application in a MEC layer of a Fifth Generation (5G) network with a specific network slice of the 5G network;
generate an identifier for the MEC application that associates the MEC application with a segmentation layer through a backhaul of the 5G network;
define a backhaul routing policy for the MEC application based on the association of the MEC application with the specific network slice of the 5G network, wherein the backhaul routing policy specifies to add the identifier for the MEC application to traffic received from the specific network slice based on the specific network slice being associated with the MEC application;
define a MEC layer access policy for the MEC application based on the identifier for the MEC application; and
control the access to the MEC application through the 5G network, including the segmentation layer, based on both the backhaul routing policy for the MEC application and the MEC layer access policy for the MEC application.

11. The system of claim 10, wherein the instructions, which when executed by the one or more processors, further cause the one or more processors to:

deploy the MEC layer access policy to a container running the MEC application in the MEC layer;
receive traffic from a network slice associated with the container through the backhaul of the 5G network;
determine whether the network slice that provided the traffic is the specific network slice of the 5G network associated with the MEC application; and
control access for the network slice to the MEC application through the container according to the MEC layer access policy based on whether the network slice is the specific network slice of the 5G network associated with the MEC application.

12. The system of claim 11, wherein the traffic is received through the backhaul of the 5G network from an access router node of the backhaul of the 5G network.

13. The system of claim 11, wherein the instructions, which when executed by the one or more processors, further cause the one or more processors to:
intercept the traffic at a sidecar of the container before the traffic is passed to the MEC application running in the container;
determine whether the network slice that provided the traffic is the specific network slice of the 5G network associated with the MEC application; and
selectively drop the traffic at the sidecar as part of controlling access to the MEC application through the container according to the MEC layer access policy based on whether the network slice is the specific network slice of the 5G network associated with the MEC application.

14. The system of claim 13, wherein the instructions, which when executed by the one or more processors, further cause the one or more processors to:
provide the identifier for the MEC application to a MEC orchestrator;
deploy the MEC application to the MEC layer through the MEC orchestrator; and
implement the MEC layer access policy at the sidecar of the container running the MEC application in the MEC layer.

15. The system of claim 11, wherein the MEC layer access policy specifies dropping traffic received at containers that fail to include the identifier for the MEC application and the instructions, which when executed by the one or more processors, further cause the one or more processors to:
determine whether the traffic received at the container from the network slice includes the identifier for the MEC application; and
selectively drop the traffic at the container based on whether the traffic from the network slice includes the identifier for the MEC application.

16. The system of claim 15, wherein an inclusion of the identifier for the MEC application in the traffic received at the container from the network slice is indicative that the network slice is the specific network slice of the 5G network associated with the MEC application.

17. The system of claim 16, wherein:
the traffic is received through the backhaul of the 5G network from an access router node of the backhaul of the 5G network; and
the identifier for the MEC application is added to the traffic at the access router node according to enforcement of the backhaul routing policy at the access router node.

18. The system of claim 10, wherein the MEC application is part of a plurality of MEC applications included in a Pod in the MEC layer and the identifier for the MEC application is also associated with at least a portion of the plurality of MEC applications included in the Pod.

19. A non-transitory computer-readable storage medium comprising instructions stored therein, which when executed by one or more processors, cause the one or more processors to:
associate a Mobile Edge Compute (MEC) application in a MEC layer of a Fifth Generation (5G) network with a specific network slice of the 5G network;
generate an identifier for the MEC application that associates the MEC application with a segmentation layer through a backhaul of the 5G network;
define a backhaul routing policy for the MEC application based on the association of the MEC application with the specific network slice of the 5G network, wherein the backhaul routing policy specifies to add the identifier for the MEC application to traffic received from the specific network slice based on the specific network slice being associated with the MEC application;
define a MEC layer access policy for the MEC application based on the identifier for the MEC application; and
control the access to the MEC application through the 5G network, including the segmentation layer, based on both the backhaul routing policy for the MEC application and the MEC layer access policy for the MEC application.

20. The non-transitory computer-readable storage medium of claim 19, wherein the instructions, which when executed by the one or more processors, further cause the one or more processors to:
deploy the MEC layer access policy to a container running the MEC application in the MEC layer;
receive traffic from a network slice associated with the container through the backhaul of the 5G network;
determine whether the network slice that provided the traffic is the specific network slice of the 5G network associated with the MEC application; and
control access for the network slice to the MEC application through the container according to the MEC layer access policy based on whether the network slice is the specific network slice of the 5G network associated with the MEC application.

* * * * *